April 27, 1965  J. D. WESTFALL  3,180,654
COMBINATION TRAILER AND DINER MEANS
Filed May 13, 1963  2 Sheets-Sheet 1
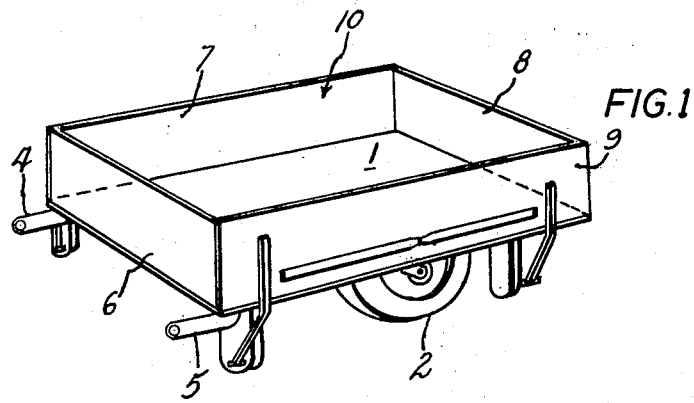
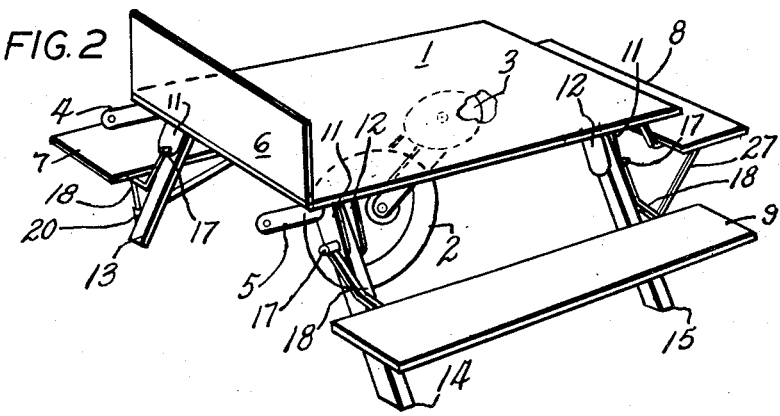
JACK D. WESTFALL
INVENTOR.
BY Earl E. Moore
Atty.

April 27, 1965 J. D. WESTFALL 3,180,654
COMBINATION TRAILER AND DINER MEANS

Filed May 13, 1963 2 Sheets-Sheet 2

JACK D. WESTFALL
INVENTOR.

BY Earl E Moore
Atty.

3,180,654
COMBINATION TRAILER AND DINER MEANS
Jack D. Westfall, San Bernardino, Calif.
(3061 Oregon St., Rialto, Calif.)
Filed May 13, 1963, Ser. No. 279,791
5 Claims. (Cl. 280—30)

This invention relates to a new and useful trailer and dining combination for use at campgrounds along the highways and other places where a table and benches are desired in combination with a trailer as a means for carrying supplies. Such a combination is in demand by motorists who wish to select their own camp site at locations where desirable facilities are not generally provided.

The combination embodies a light trailer designed to be attached to the rear of an automobile. The trailer is so constructed and arranged that parts thereof form a picnic table and a plurality of benches when the trailer is unfolded from a carrier means to a dining means. Camping paraphernalia and food supplies may be carried by the trailer when not being used as a table or platform.

One of the principal objects of this invention is to provide a picnic table or the like and benches to go with it and which are integrally constructed as part of the trailer and so arranged that when the trailer is unloaded and unfolded, a flat table surface is presented along with comfortable benches at proper heights to fully enjoy the full use of the table.

Another object of this invention is to provide a trailer and the like wherein its upstanding closure sides are hinged so that the sides can be swung downwardly to provide proper and comfortable seats about the main panel which provided the formed floor or platform of the trailer.

Other objects, details, and purposes of this trailer and dining combination will become apparent upon careful perusal of the specifications and drawings as presented herewith.

In the drawings:

FIG. 1 is a perspective view of the trailer and dining combination, but without showing an automobile attached thereto or associated therewith;

FIG. 2 is a perspective view of the trailer and dining combination when it is unfolded to provide a dining table with benches supported by it;

Figure 3:
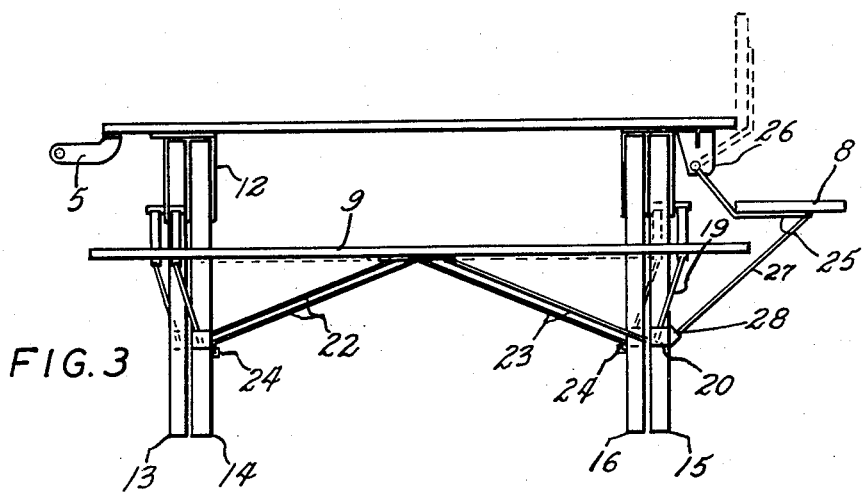
FIG. 3 is a side elevational view of the combination, but the swivel wheel has been omitted.

The reference character 1 indicates the main panel, floor or platform of the trailer and which becomes the table top of the picnic device when the side walls are lowered into position. When the device is folded, the panel 1 is a floor and/or platform, but when it is unfolded, the panel 1 is a table top and/or platform. However, this main panel 1 can be made of various materials, but thick plywood of several plies is believed strong enough structurally when used with reasonable care. Obviously, various structural elements such as angle iron and channel irons may be employed to give the main panel 1 sufficient further strength in the event that it is desired to carry heavy loads thereon. Therefore, the panel 1 is the body or chassis for the trailer. A single swivel type of wheel support is shown, but obviously, the provision of additional wheels or roller means would not alter the broad scope of this invention. A wheel support means 2 is illustrated and is shown mounted upon a swivel means 3 that is attached to the bottom of chassis of the trailer by any suitable means such as bolts, screws etc. that may pass through the panel 1.

The main panel 1 is provided with or has fixed thereto a pair of brace means indicated at 4 and 5 that are secured to this main master panel 1 at the forward end thereof and the distal ends of these braces are adapted to be secured to a suitable attachment means, not shown, that extends rearwardly from the bumper portion of a vehicle, not shown, but in a well known manner. Trailer attachments upon automobile bumpers are so common that it is believed unnecessary to describe them.

About the perimeter of the main panel 1 there are the plurality of upstanding walls or side panels 6, 7, 8 and 9 which are so positioned that they make a tight peripheral wall so that supplies of all kinds can be safely carried in the cargo space indicated in general by the numeral 10. When the side panels are shifted to a lowered position, they become seats or benches as clearly shown in FIG. 2 of the drawings.

Figure 4:
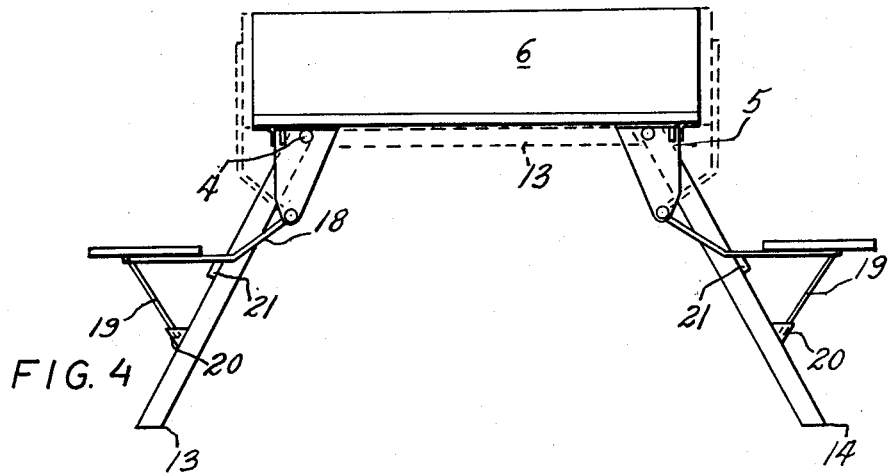
FIG. 4 is another elevational view thereof which is at right angles to that shown in FIG. 3.

At each corner underneath the main panel or floor 1 there is a pair of brackets indicated by the numerals 11 and 12 which are positioned as shown and which are inverted U-shaped brackets wherein the web portion of each bracket is secured to the under portion of the main panel 1. Each pair of brackets provide a pivot connection at the top for their respective table legs. There are four table legs numbered from 13 to 16 inclusive. Such a pivot connection means allows the legs to be folded, as shown in FIG. 4 where they remain when not in use.

The outer bracket 11 of each pair support a bearing member 17 and to each is pivoted a seat brace 18, bent slightly as shown, and which supports its respective end of a seat. This brace is a channel and neatly accommodates a prop 19 which is pivotally connected to its respective brace 18 in a manner so that when it is not in use, it is neatly folded between the flanges of its respective channel shaped brace. Each table leg is provided with an angularly shaped cup element 20 which receives one end of its respective prop in its open end so that its prop can help support one end of a seat. Stop elements 21 are provided on each table leg to help support its respective bracket 18 and hence a seat portion.

To strengthen the central portion of the longer seats 7 and 9, the struts 22 and 23 are provided for each seat. Each strut is pivoted underneath the central portion of its respective seat and the other end of each strut is free to engage a pocket means 24 fixed to each leg. These struts are folded underneath the seats when not in use and held there by suitable clips.

The seat 8 is shown at a higher elevation, when opened for use, than the other two seats in that this seat 8 is designed to accommodate children in that it is at a proper height for them. Each end of the seat 8 has an under brace 25, shaped as shown, and the other end of each brace is pivoted to a bracket member 26 which is secured to an underportion of the main panel 1. A brace 27 is pivoted to seat 8 and its lower end engages the pocket means 28.

By careful inspection of the open top trailer, it can be seen that applicant has provided a trailer device that can be independently supported by a plurality of legs and wherein the side walls or panels can be shifted downwardly to provide seat means about the main panel so that it can be used as a table. Sufficient means are provided so that the table is firm and structurally sound and wherein the main panel or floor along with its upstanding side walls provide a very satisfactory means for cartage of supplies and equipment.

Certain novel features and details of this invention are disclosed herein, and in some cases in considerable detail, in order to make the invention clear in at least one form thereof. However, it is to be clearly understood that the invention, as disclosed, is not necessarily limited to the exact form and details disclosed since it is apparent that various modifications and changes may be made without departing from the spirit and scope of the claims of this invention.

Having thus described my invention, what is claimed as new and desired to be secured by Letters Patent is:

1. A platform having upstanding side walls hinged to a subjacent portion thereof, wheel means supporting the platform, the side walls being hinged so that when swung outwardly and downwardly they provide seats with material leg space and the platform automatically becomes a table free of structural elements on all but one edge thereof.

2. The platform recited in claim 1 wherein the side walls are so hinged that one provides a seat at a different height than another so as to comfortably accommodate children.

3. A portable dining device comprising a main panel supported by wheel means, side panels about the periphery of the main panel providing a well for carriage of material, at least one of the side panels having bent arm means at each end thereof and fixed thereto, a pair of spaced apart brackets fixed to the under portion of the main panel, pivot means at the lower ends of each bracket, the lower portions of the arm means being directed inwardly of the main panel and having at their ends pivot means making connection with the pivot means at the lower ends of the brackets so that when the side panel is swung from an upright position to a horizontal position, the side panel moves well outwardly from the proximate edge of the main panel as it moves downwardly to a predetermined position to form a seat means along the panel.

4. That set out in claim 3 wherein each bracket consists of an inverted U-shaped element which pivotally accommodates the upper end of a leg means for the main panel.

5. A trailer platform adapted to be attached to an automobile and the like, the platform having a periphery, upstanding side walls about the periphery, means hinging one or more of the side walls to the platform so that it or they can be swung outwardly and downwardly to provide seats about the platform and thus the platform is converted into a table free of structural parts along all edges except one, folding legs attached to the platform and which legs can be opened to provide means for firming the platform, detachable means provided between the seats and said legs to firm the seats.

References Cited by the Examiner
UNITED STATES PATENTS

| | | | |
|---|---|---|---|
| 1,704,574 | 3/29 | Nelson | 296—14 |
| 2,162,181 | 6/39 | Skinner | 296—23 X |
| 2,249,845 | 7/41 | Mitchell | 297—159 |
| 2,485,475 | 10/49 | Brenneman | 296—23 |
| 2,512,473 | 6/50 | Alch | 297—159 |
| 2,601,170 | 6/52 | Retzlaff | 296—57 X |
| 2,951,530 | 9/60 | Amlotte | 297—159 |

MILTON BUCHLER, *Primary Examiner.*

KENNETH H. BETTS, A. HARRY LEVY, *Examiners.*